Patented Mar. 7, 1939

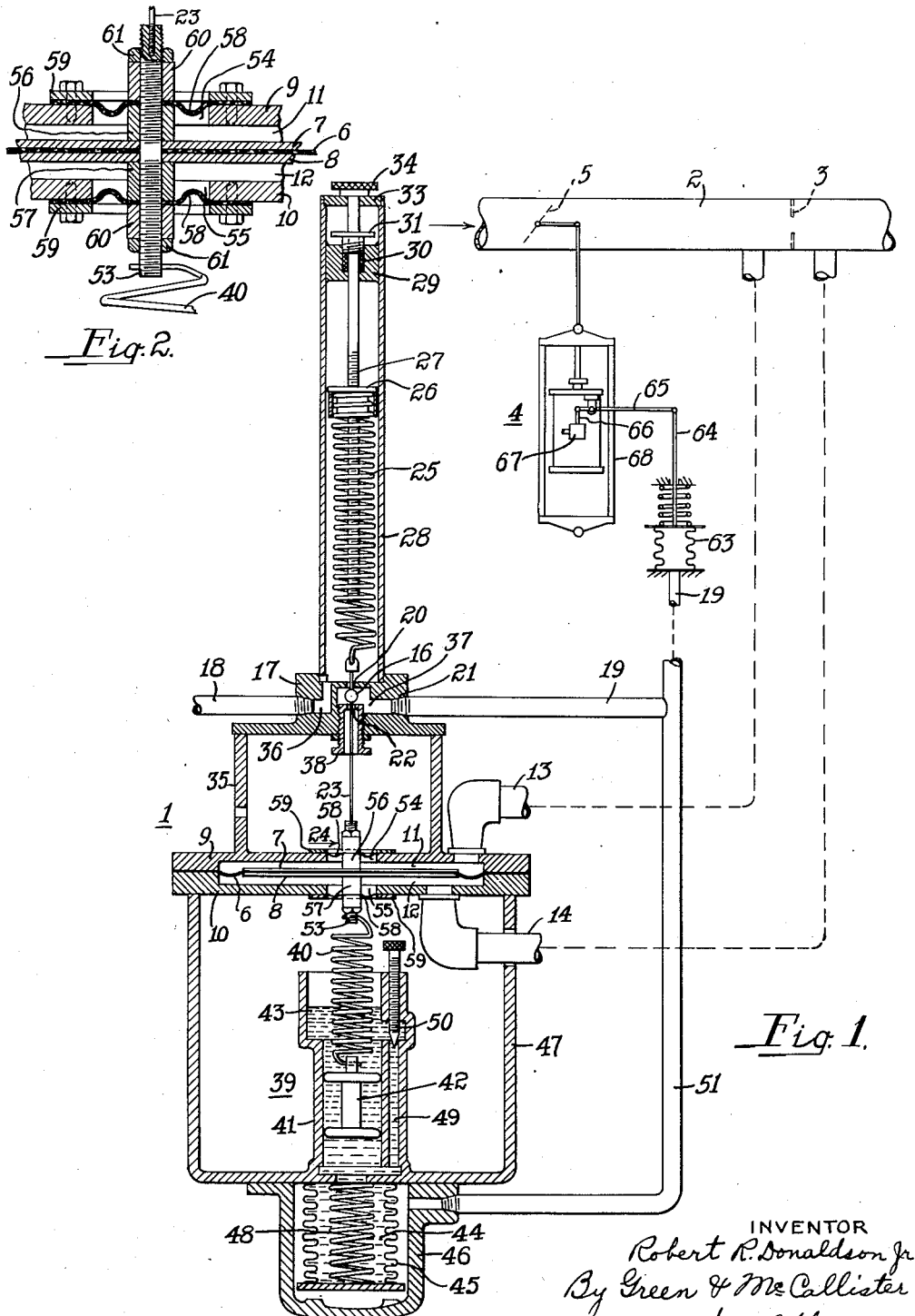

2,149,390

UNITED STATES PATENT OFFICE 2,149,390

PRESSURE REGULATING DEVICE

Robert R. Donaldson, Jr., Pittsburgh, Pa., assignor to John M. Hopwood, Dormont, Pa.

Application April 3, 1935, Serial No. 14,468
Renewed May 13, 1936

16 Claims. (Cl. 50—10)

This invention relates to pressure sensitive devices, and more particularly to devices which will respond to pressure changes in a flowing quantity and transmit a control force or impulse to a regulator disposed to effect adjustment of such quantity in accordance with the pressure changes.

An object of this invention is the provision of a regulating device that shall be simple in construction, sensitive in operation, which may be operated in accordance with changes in one pressure or in accordance with the difference between two pressures, and which will control the delivery of control pressures or impulses that will govern the operation of a device having to do with the control of the pressures to which the device responds.

Another object of the invention is the provision of a pressure sensitive regulating device having a dashpot associated therewith which is actuated by and in accordance with the control impulses or forces transmitted by the device and which will so augment the operation of the pressure responsive mechanism of the regulator that the mechanism controlled by the device will have sufficient time to perform its adjusting function before the device makes any further change in the actuating control impulses or forces.

Other objects of the invention will in part be apparent and will in part be obvious from the following description taken in conjunction with the accompanying drawing in which:

Figure 1 is a view illustrating the regulating device embodying this invention in vertical transverse section, the device being shown as controlling a regulator which operates a damper or valve in a pipe line in accordance with the difference between the pressures on opposite sides of an orifice in the pipe line; and Fig. 2 is a fragmentary view in section taken on line II—II of Fig. 1 showing certain details of construction.

Throughout the drawing and the specification, like reference characters indicate like parts.

In the drawing, a regulating device 1 illustrating an embodiment of the invention, is shown connected to a pipe line 2 so as to respond to the changes in pressure on opposite sides of an orifice 3, that is to the pressure drop across the orifice, and arranged to control a regulator 4 operating a damper 5 in accordance with variations in the pressure drop across the orifice. Device 1 is arranged to so control the operation of regulator 4 that damper 5 operated thereby will maintain such a pressure on the upstream side of orifice 3 that the pressure drop across the orifice will be maintained substantially constant at some predetermined value. Regulator 4 as illustrated is of the type shown in United States Patent No. 1,931,906 and operates to adjust the damper in incremental steps of varying length depending on the magnitude of the change in control impulse supplied to it.

While device 1 is shown as controlling a regulator which operates a damper in a pipe line to maintain a predetermined pressure condition on opposite sides of an orifice, it is to be understood that device 1 may be utilized to control any operating device which has to do with regulating a condition having to do with the pressure or pressures to which device 1 responds, whether such operating device actuates a damper, valve, rheostat or other device.

Device 1 comprises a pressure sensitive diaphragm 6, the inner portion of which is clamped between thrust plates 7 and 8 and the margin of which is clamped between suitable housing members 9 and 10 which provide chambers 11 and 12 on opposite sides of the diaphragm. If the regulator 1 is to respond to the difference between two pressures, say the pressures on opposite sides of orifice 3, then one chamber, say chamber 11, is connected by a pipe 13 to one side of the orifice and the other chamber is connected by a pipe 14 to the other side of the orifice.

If device 1 is to respond to a pressure which is below atmospheric, that is, to a suction for example, then the lower chamber is connected to the line in which the suction is to be regulated and the upper chamber would be open to the atmosphere. On the other hand, if device 1 is to respond to and control only a single positive pressure, then the upper chamber would be connected to this pressure and the lower chamber would be open to atmosphere.

Diaphragm 6 is utilized to operate a valve 16 mounted in a valve body 17 and disposed to control the magnitude of a pressure medium such as compressed air, for example, that is delivered from the supply pipe 18, in which the pressure is maintained at a substantially constant value, to a sending line 19. The sending line communicates with or delivers the control impulses to a device to be actuated in accordance therewith, for example, regulator 4. The valve body has an inlet port 20, an outlet port 21 to which the sending line 19 is connected, and an exhaust port 22. Valve 16 is preferably in the form of a ball which is disposed about or carried by a relatively flexible link 23, that extends through the inlet and exhaust ports and which is connected at its lower end to the flexible diaphragm by means 24. The upper end of link 23 is connected to a tension spring 25, the upper end of which is anchored in a block 26 that is threaded on a screw 27. By turning the screw in one direction or the other the tension in the spring may be adjusted.

Spring 25 is disposed within a tubular housing 28 into which the pressure from the supply pipe 18 passes and thence through the inlet port 20 into the valve body. The upper end of housing 28 carries a stop or plug 29 which is joined at its periphery to the housing in such fashion as to form a pressure tight connection therewith. This plug has a packing gland 30 containing packing therein, and a packing nut 31 which is threaded into the packing gland so that no pressure will escape through the upper end of the housing past screw 27. Screw 27 extends through the upper end of the housing and is journaled in a closure member 33 carried by the uppermost ends of the housing and is fitted with a knurled disc 34 whereby the screw may be turned to adjust the tension of the spring.

Valve body 17 as shown in the drawing, may be made in the form of a plate which is supported on a cylindrical wall 35 formed as an integral part of housing member 9. This plate has an upwardly extending boss constituting the valve body 17 and in which is formed a port 36, that discharges into housing 28 and to which the pressure supply pipe is connected, and with a cored out portion 37 into which the pressure medium flows from the cylindrical housing through the inlet port 20, and to which the sending line 19 is connected. The exhaust port 22 is formed in a hollow bushing 38 which is threaded into the valve body. As may be seen in the drawing, the distance between the inlet port 20 and the exhaust port 22 may be varied by turning bushing 38 into or out of the valve body. This spacing between the exhaust port and the inlet port changes the relation between the position of the ball valve with respect to ports 20 and 22 and the pressures delivered to the sending line 19.

Since the ball valve 16 is between the inlet port and the exhaust port, it will be apparent that as this ball is moved towards the inlet port and away from the exhaust port, the pressure in the valve body and in the sending line 19 will be a function of the pressure drop through the inlet port and the rate of escape of air from the exhaust port, and that the closer this ball valve approaches the inlet port the lower the pressure in the valve body and the sending line will be. Similarly, if the ball valve is moving away from the inlet port and towards the exhaust port, the rate at which air may escape to the atmosphere through the exhaust port will decrease, so that the pressure in the valve body and sending line 19 will increase, and that when the ball valve is seated on the exhaust port, the pressure in the valve body and sending line will be equal to the pressure in the supply line 18.

As stated previously herein, device 1 responds to the pressure drop across the orifice 3 and transmits such pressure impulses to regulator 4 that the damper or valve 5 will be shifted to such a position as will maintain the pressure drop across the orifice substantially constant at the desired value. This means then, that diaphragm 6 will, whenever the pressure drop across the orifice is at the desired value, occupy a substantially fixed position. If the pressure drop across orifice 3 changes, it will be apparent that a certain length of time will be required for device 1 to respond and/or regulator 4 to change the position of the damper sufficiently to restore the pressure drop across the orifice to the desired normal value. It is therefore apparent that if the return of diaphragm 6 to its normal position is delayed long enough to permit the adjustment in the damper to take place, that the pressure drop across the orifice may be restored to its normal value by the time the diaphragm has returned to its normal position thereby preventing any "over" or "under" shooting or hunting of the regulator.

In order to delay the return of diaphragm 6 to its normal position after a change in the pressure drop across orifice 3 has occurred, a dashpot 39 is provided which is yieldingly connected by a spring 40 to the under side of diaphragm 6. Dashpot 39 comprises a cylinder 41 in which a piston 42 works, and to which spring 40 is connected. The upper end of the cylinder terminates in a chamber 43 which may be called an overflow chamber, and the lower end terminates in a flexible chamber 44 such as may be formed by a bellows 45, for example, and which is disposed within a housing 46. Housing 46 is secured in fluid or pressure tight relationship to a main housing 47 which carries the dashpot cylinder 41 and the housing members 9 and 10.

Within the flexible chamber 44, a spring 48 is disposed which tends to expand the bellows chamber to its maximum volumetric capacity. A by-pass 49 connects the overflow chamber 43 with the lower end of the cylinder 41 and the diaphragm chamber 44 and in this bypass an adjustable needle valve 50 is disposed by means of which the rate of flow of a liquid, such as oil, between the overflow chamber 43 and the bellows chamber 44 may be regulated. The dashpot piston 42 is operated by and in accordance with the pressures transmitted to the sending line 19. Thus, for example, if the pressures transmitted to the sending line are increasing, increasing pressures are communicated from the sending line through a pipe 51 into housing 46. These increasing pressures cause bellows 45 to collapse and to displace oil and thereby cause piston 42 to move upwardly and to compress spring 40. Spring 40 therefore sets up a force tending to return diaphragm 6 to its normal position. At the beginning of the upward movement of dashpot piston 42, this force is at its maximum value, but since oil leaks through needle valve 51 into overflow chamber 43, the pressure exerted on the piston will gradually diminished and be dissipated entirely when a sufficient amount of oil has been transferred into the overflow chamber to restore equilibrium between the spring 48 and the pressure acting on bellows 45. Therefore, the force exerted by spring 40 on diaphragm 6 also diminishes at the same rate and finally becomes nil.

Likewise, if the pressures transmitted to sending line 19 are decreasing, the pressures acting on the bellows 45 will also be decreasing so that spring 48 will tend to expand bellows 45 and thereby make room for the transfer of oil from the over-flow chamber through needle valve 50 into the lower portion of the cylinder and the said bellows. When bellows 45 expands, a downward pull is exerted on piston 42 tending to urge diaphragm 6 towards its normal position. But this force gradually decreases as oil flows from the overflow chamber 43 into the space below piston 42.

The means 24 for connecting diaphragm 6 to springs 25 and 40 is shown in Fig. 2 and comprises a rod 53 which is threaded at its opposite ends and which extends through openings 54 and 55 in the housing members 9 and 10, the thrust plates 7 and 8 and diaphragm 6. On this rod, sleeves 56 and 57 are threaded which clamp plates 7 and 8 and diaphragm 6 tightly together. The openings 54 and 55 are sealed by means of light flexible diaphragms 58 which are clamped in pressure-tight relationship to the housing members 9 and 10 by means of rings 59. The apertures in the sealing diaphragms 58 through which rod 53 passes, are sealed tight by means of washers 60 which are drawn up tightly by nuts 61 to clamp the diaphragms tightly between sleeves 60, 56, and 60, 57, respectively. Link 23 may be connected to rod 53 in any suitable manner, and a convenient way is to drill and tap the upper end thereof and screw the lower end of link 23 into it.

Assuming that device 1 is to maintain a predetermined pressure drop or pressure differential across an orifice, say for example, orifice 3 in pipe line 2 through which a fluid medium passes, such as gas or air, and that this differential is to be maintained substantially constant within a variation of say 0.01" of water, the opeartion of this device would be as follows: After connecting lines 13 and 14 to opposite sides of the orifice 3, and adjusting the pressure differential to the desired value, diaphragm 6 would be subjected to the pressure differential to be maintained. Spring 25 is then adjusted by turning the knurled nut 34 until the tension in spring 25, the weight of the parts suspended therefrom, and the pressure difference or drop through the orifice 3 are in such a state of balance that diaphragm 6 occupies its neutral or midway position. When in this position, valve 16 will be in a position midway between the inlet and exhaust ports 20 and 22. When the ball valve 16 is in this position, it is to be assumed that the pressure drop across orifice 3 is of the proper value. If the pressure differential increases, the pressure above the diaphragm will exceed that below it and the diaphragm will move downwardly. The ball valve 16 will move towards exhaust port 22 and recede from the inlet port 20, thereby increasing the area for the admission of air to the valve body, the sending line 19 and chamber 46 surrounding bellows 45, and decreasing the area of the discharge passage through exhaust port 22. The result would be that the pressure within valve body 17 will increase. This increased pressure is communicated by the sending line 19 to a bellow 63 of regulator 4 which expands and, through a rod 64 and lever 65, moves a valve stem 66 of a pilot valve 67 downwardly to admit air under pressure to the bottom of the cylinder and cause a piston therein to move a regulator frame 68 upwardly and shift damper 5 towards its closed position. The damper is moved far enough towards closed position to correct the pressure differential and restore it to its normal value. At the same time that this increased pressure is transmitted to the bellows 63 of regulator 4, this increased pressure is also communicated to chamber 46 surrounding bellows 45. This increased pressure causes bellows 45 to contract, against the force of spring 48, and displace oil thereby causing the dashpot piston 42 to move upwardly, thereby compressing spring 40 and setting up a force which tends to return diaphragm 6 to its neutral position. By properly adjusting the needle valve 50 the rate at which oil flows through bypass 49 and the needle valve into overflow chamber 43 could be so adjusted that the return of diaphragm 6 to its neutral position could be delayed long enough to allow regulator 4 to accomplish its pressure differential regulating function by the time diaphragm 6 reaches its neutral position. As the oil passes through bypass 49, the pressure exerted on the dashpot piston 42 is relieved so that it tends to move downwardly and decrease the compression of spring 40, thereby relieving the force which tends to return the diaphragm towards its neutral position.

Thus, it is seen that as the pressure differential is corrected and restored to its normal value, the forces tending to return the diaphragm to its neutral position will be gradually diminishing. Thus by the time the pressure drop across orifice 3 has been restored to its proper value, the only controlling force acting on diaphragm 6 will be the pressure differential acting on it.

When the pressure differential across orifice 3 is decreasing, the pressure acting on the lower side of diaphragm 6 will be approaching the value of the pressure which acts on the upper side thereof, so that spring 25 will move diaphragm 6 and ball valve 16 upwardly. As the ball valve 16 is approaching inlet port 20, it is receding from the exhaust port 22, so that the pressure within valve body 17, the sending line 19, and in chamber 46 surrounding the bellows 45 will also be decreasing. As diaphragm 6 is moved upwardly, tension is imposed in spring 40 which opposes the tension of spring 25. The reduced pressure delivered to bellows 63 of regulator 4 will cause the regulator frame 68 to move downwardly and to open the valve or damper 5 an amount sufficient to increase and restore the pressure differential across orifice 3 to the desired value. At the same time, the pressure acting on the bellows chamber 46 is also decreasing, causing the bellows 45 to expand and make room for oil to flow from the overflow chamber 43, through the needle valve 50 and into the space below the dashpot piston 42. As the oil flows into the space below the dashpot piston, the force exerted by the dashpot spring 40 on diaphragm 6 and which tends to return it to its neutral position, is diminishing but it diminishes at such a rate that regulator 4 will have performed its adjusting function by the time the diaphragm has reached its normal or neutral position.

While device 1 has been shown in connection with a particular type of regulator and in connection with a particular practical use, i. e., the controlling of a pressure drop across an orifice, it will be appreciated that this device may be utilized to control the outlet damper of a furnace so as to maintain a given or desired pressure in the combustion chamber of a furnace, for example, an openhearth furnace, or it may be utilized to regulate the supply of fuel in accordance with the draft loss across the passes of a boiler, as well as for other purposes which will be readily apparent to those skilled in this art. It is therefore to be understood that the particular use herein disclosed for which device 1 is suited, is not intended to impose limitations on the invention, but that only such limitations shall be placed on the invention as are imposed by the prior art and the appended claims.

What I claim as new and desire to secure by Letters Patent is:

1. A pressure sensitive device for controlling the operation of a pressure regulator disposed to maintain a substantially constant pressure condition in a duct or conduit, said device comprising a diaphragm connected to respond to changes in the pressure condition, a spring and a link connecting the spring to one side of the diaphragm, a dashpot having a piston yieldingly connected to the other side of the diaphragm, the dashpot having a fluid therein, a valve body having an inlet connected to a source of fluid pressure, an exhaust port and an outlet port, the link passing through said inlet and exhaust port, said outlet being disposed for connection to said pressure regulator, a valve member carried by said link in position to throttle either the inlet or exhaust port in accordance with the pressure acting on the diaphragm, a pressure connection between the outlet port and dashpot and means acted on by said pressure for varying the pressure on the fluid in the dashpot in such direction as to cause the piston to return the diaphragm to a predetermined position.

2. A pressure sensitive device for controlling the operation of a pressure regulator disposed to maintain a substantially constant pressure condition in a duct or conduit, said device comprising a diaphragm connected to respond to changes in the pressure condition, a spring and a link connecting the spring to one side of the diaphragm, a dashpot on the other side of the diaphragm and having a piston, a spring connecting the piston to the diaphragm, the dashpot having a fluid therein to act on the piston, a valve body having an inlet connected to a source of fluid pressure, an exhaust port and an outlet connected to said pressure regulator, the link passing through said inlet and exhaust port, a valve member carried by said link in position to throttle either the inlet or the exhaust ports in accordance with its positions as affected by the pressure acting on the diaphragm, a pressure connection between the outlet and dashpot, means acted on by said pressure for varying the pressure on the fluid in the dashpot in such direction as to cause said piston to return the diaphragm to a predetermined position, and means for causing the returning force exerted on the diaphragm by the dashpot to diminish at a predetermined rate.

3. A pressure sensitive control device comprising a pressure sensitive diaphragm, a valve body having an inlet port adapted to be connected to a supply of fluid under pressure, an exhaust port, and an outlet adapted to be connected to a pressure actuated control device, a spring, a link passing through said inlet and exhaust ports and connected at one end to said spring and at the other to said diaphragm, a valve in said valve body and carried by said link, which controls the value of pressure delivered to the outlet in accordance with the movement of the diaphragm, a dashpot having a piston therein, a spring connecting said piston and diaphragm on a side opposite that to which the link is connected, an overflow chamber above the piston, a displacement chamber below the piston and having a supply of liquid therein, a chamber surrounding the displacement chamber and connected with the outlet of said valve whereby the pressure on said displacement chamber causes the piston to move, whenever a change in outlet pressure occurs, and deflect the spring connected thereto which in turn acts to move the diaphragm in a direction opposite to that in which it is moved by the pressure acting thereon, and a restricted bypass connecting the overflow and displacement chambers which acts to relieve the fluid pressure acting on the piston at a rate which diminishes to substantially zero value when the forces acting on the diaphragm reach a state of equilibrium.

4. A pressure sensitive device comprising a chamber having a flexible pressure responsive member therein, a valve body provided with an inlet port, an exhaust port and an outlet port for the delivery of controlled pressure impulses, a link passing through said inlet and exhaust ports and connected at one end to said pressure responsive member, a valve member carried by said link and positioned between said inlet and exhaust ports, a spring connected to the other end of said link and yieldingly urging said pressure responsive member in one direction, a dashpot of the fluid displacement type having a moving part thereof yieldingly connected to the other side of said pressure responsive member, and means actuated by and in accordance with the controlled pressure of said valve for energizing the dashpot in such direction as to urge the pressure responsive member in a direction opposite to that in which it is moved by the force to which it responds.

5. A pressure sensitive device comprising a chamber having a flexible pressure responsive member therein, a valve body provided with an inlet port, an exhaust port and an outlet port for the delivery of controlled pressure impulses, a link passing through said inlet and exhaust ports and connected at one end to said pressure responsive member, a valve member carried by said link and positioned between said inlet and exhaust ports, a spring connected to the other end of said link and yieldingly urging said pressure responsive member in one direction, a dashpot of the fluid displacement type having a moving part thereof yieldingly connected to the other side of said pressure responsive member, means actuated by and in accordance with the controlled pressure of said valve for energizing the dashpot in such direction as to urge the pressure responsive member in a direction opposite to that in which it is moved by the force to which it responds, and means for gradually rendering the dashpot ineffective at a rate which is proportional to the magnitude of the controlled impulse issuing from said valve.

6. A pressure sensitive device comprising a chamber having a flexible pressure responsive member therein, a valve body provided with an inlet port, an exhaust port and an outlet port for the delivery of controlled pressure impulses, a link passing through said inlet and exhaust ports and connected at one end to said pressure responsive member, a valve member carried by said link and positioned between said inlet and exhaust ports, a spring connected to the other end of said link and yieldingly urging said pressure responsive member in one direction, and means actuated by and in accordance with the magnitude of the controlled impulse issuing from said valve for urging said pressure responsive member in a direction opposite to that in which it is moved by the pressure to which it responds.

7. A pressure sensitive device comprising a chamber having a flexible pressure responsive member therein, a valve body provided with an inlet port, an exhaust port and an outlet port for the delivery of controlled pressure impulses, a link passing through said inlet and exhaust ports and connected at one end to said pressure responsive member, a valve member carried by said link and positioned between said inlet and exhaust ports, a spring connected to the other end or said link and yieldingly urging said pressure responsive member in one direction, means actuated by and in accordance with the magnitude of the controlled impulse issuing from said valve for urging said pressure responsive member in a direction opposite to that in which it is moved by the pressure to which it responds, and means for rendering said urging means ineffective at a predetermined rate.

8. A pressure sensitive device comprising a chamber having a flexible pressure responsive member therein, a valve body provided with an inlet port, an exhaust port and an outlet port for the delivery of controlled pressure impulses, a link connected at one end to said pressure responsive member, a valve member carried by said link and positioned between said inlet and exhaust ports, a spring connected to said link and yieldingly urging said pressure responsive member and valve member in one direction, means actuated by and in accordance with the magnitude of the controlled impulse issuing from said valve for urging said pressure responsive member in a direction opposite to that in which it is moved by the pressure to which it responds, and means for rendering said urging means ineffective at a predetermined rate.

9. A pressure sensitive control device comprising a pressure sensitive diaphragm, a valve body having an inlet port adapted to be connected to a supply of fluid under pressure, an exhaust port, and an outlet adapted to be connected to a pressure actuated control device, a spring connected to said diaphragm, a valve in said valve body connected to said diaphragm for controlling the value of pressure impulses delivered to the outlet in accordance with the movement of the diaphragm, a dashpot having a piston therein, a spring connecting said piston and diaphragm in opposition to the first named spring, an overflow chamber above the piston, a displacement chamber below the piston and having a supply of liquid therein, a chamber surrounding the displacement chamber and connected with the outlet of said valve whereby the pressure on said displacement chamber causes the piston to move in response to changes in the outlet pressure impulses, and deflect the spring connected thereto which in turn acts to move the diaphragm in a direction opposite to that in which it is moved by the pressure acting thereon, and a restricted bypass connecting the overflow and displacement chambers which acts to relieve the fluid pressure acting on the piston at a rate which diminishes to substantially zero value when the forces acting on the diaphragm reach a state of equilibrium.

10. A pressure sensitive device comprising a chamber having a flexible pressure responsive member therein, a valve body provided with an inlet port, an exhaust port, and an outlet for delivering controlled pressure impulses to a device to be controlled thereby, a valve member connected to said pressure responsive member and positioned to control one or the other of said inlet and exhaust ports to thereby control the pressure at the outlet port, a spring connected to said pressure responsive member and yieldingly urging the same in one direction, a dashpot of the fluid displacement type having a moving part thereof yieldingly connected to said responsive member in opposition to said spring, and means directly responsive to and actuated by and in accordance with the controlled outlet pressure impulses of said valve for energizing the dashpot in such direction as to urge the pressure responsive member in a direction opposite to that in which it is moved by the force to which it responds.

11. A pressure sensitive device comprising a chamber having a flexible pressure responsive member therein, a valve operated by said pressure responsive member for effecting the delivery of controlled pressure impulses to a device to be regulated, a spring connected to said pressure responsive member and yieldingly urging the same in one direction, a dashpot of the fluid displacement type having a moving part thereof yieldingly connected to said responsive member in opposition to said spring, means directly responsive to and actuated by and in accordance with the controlled pressure of said valve for energizing the dashpot in such direction as to urge the pressure responsive member in a direction opposite to that in which it is moved by the force to which it responds, and means for gradually rendering the dashpot ineffective at a rate which is proportional to the magnitude of the controlled impulse issuing from said valve.

12. A pressure sensitive device comprising a chamber having a flexible pressure responsive member therein, a valve disposed for actuation by said responsive member to deliver controlled pressure impulses to a device to be controlled, a spring connected to said pressure responsive member and yieldingly urging the same in one direction and means directly responsive to and actuated by and in accordance with the magnitude of the controlled impulse issuing from said valve for urging said pressure responsive member in a direction opposite to that in which it is moved by the pressure to which it responds.

13. A pressure sensitive device comprising a chamber having a flexible pressure responsive member therein, a valve body provided with an inlet port, an exhaust port and an outlet port for the delivery of controlled pressure impulses to a device to be actuated thereby, a valve member actuated by said flexible member and positioned to control at least one of said inlet and exhaust ports to thereby vary the controlled pressure impulses, a spring connected to said valve member and urging the same in one direction, means directly responsive to and actuated by and in accordance with the magnitude of the controlled impulse issuing from said valve for urging said pressure responsive member in a direction opposite to that in which it is moved by the pressure to which it responds, and means for rendering said urging means ineffective at a predetermined rate.

14. In combination, a device to be regulated, a pressure-sensitive device for transmitting pressure impulses to said device to be regulated, said pressure-sensitive device comprising a pressure-sensitive element arranged to move in response to pressure changes, means yieldingly connected to said pressure-sensitive element, a dashpot having a movable element connected to said sensitive element in opposition to said yielding means, the dashpot having fluid therein, means actuated by said pressure-sensitive element for transmitting pressure impulses to said device to be regulated that vary in magnitude with the response of said element to changes in pressure, and means directly responsive to said transmitted pressure impulses for so varying the pressure imposed on the fluid in said dashpot that the movable element thereof tends to actuate the pressure-sensitive element to a predetermined position.

15. In combination, a device to be regulated, a pressure-sensitive device for transmitting pressure impulses to said device to be regulated, said pressure-sensitive device comprising a pressure-sensitive element arranged to move in response to pressure changes, means yieldingly connected to said pressure-sensitive element, a dashpot having a movable element connected to said sensitive element in opposition to said yielding means, the dashpot having fluid therein, means actuated by said pressure sensitive element for transmitting pressure impulses to a regulator that vary in magnitude with the response of said element to changes in pressure, means directly responsive to said transmitted pressure impulses for so varying the pressure imposed on the fluid in said dashpot that the movable element thereof tends to actuate the pressure-sensitive element to a predetermined position, and means for dissipating the force exerted by the movable element of the dashpot on said pressure-sensitive element at a predetermined rate.

16. In combination, a regulator motor, a pressure-sensitive control device comprising a flexible pressure responsive member, means for balancing said responsive member, valve means comprising a body having inlet and exhaust ports and an outlet port for delivering controlled fluid pressure impulses to said regulator motor, a valve member actuated by said flexible member and positioned to control one or the other of said inlet or exhaust ports by and in accordance with movements of said flexible member to thereby vary said controlled fluid pressure impulses, a dashpot having a driven element and a driving element, one of said elements being yieldingly connected to said flexible pressure responsive member, and the other dashpot element being directly responsive to and operated by and in accordance with the controlled fluid pressure impulses delivered through the outlet port of said valve and connected to urge said valve member towards the position from which it was moved by said flexible pressure-responsive member.

ROBERT R. DONALDSON, Jr.